US012609784B2

(12) United States Patent
Shekar et al.

(10) Patent No.: US 12,609,784 B2
(45) Date of Patent: Apr. 21, 2026

(54) DATA INTEGRITY VERIFICATION FOR NETWORK FILE SYSTEMS

(71) Applicant: VMware LLC, Palo Alto, CA (US)

(72) Inventors: Srinivas Shekar, Bangalore (IN); Sakthi Kumar, Bangalore (IN); Ulka Vaze, Pune (IN); Praveen Kumar Singh, Pune (IN)

(73) Assignee: VMware LLC, Palo Alto, CA (US)

( * ) Notice: Subject to any disclaimer, the term of this patent is extended or adjusted under 35 U.S.C. 154(b) by 51 days.

(21) Appl. No.: 18/886,878

(22) Filed: Sep. 16, 2024

(65) Prior Publication Data

US 2026/0081718 A1     Mar. 19, 2026

(51) Int. Cl.
*H04L 1/00* (2006.01)
*H04L 67/1097* (2022.01)

(52) U.S. Cl.
CPC .......... *H04L 1/0045* (2013.01); *H04L 1/0061* (2013.01); *H04L 67/1097* (2013.01)

(58) Field of Classification Search
None
See application file for complete search history.

(56) References Cited

U.S. PATENT DOCUMENTS

| | | | | |
|---|---|---|---|---|
| 8,627,071 B1 * | 1/2014 | Corbett | ................. | H04L 9/3242 713/168 |
| 2004/0078467 A1 * | 4/2004 | Grosner | ................. | G06F 16/10 707/999.01 |

| | | | | |
|---|---|---|---|---|
| 2004/0117438 A1 * | 6/2004 | Considine | ........... | G06F 11/2074 711/118 |
| 2010/0131669 A1 * | 5/2010 | Srinivas | .................. | G06F 9/452 709/233 |
| 2014/0122892 A1 * | 5/2014 | Corbett | ................. | H04L 63/123 713/181 |
| 2014/0201838 A1 * | 7/2014 | Varsanyi | ............... | G06F 21/552 726/23 |
| 2015/0032691 A1 * | 1/2015 | Hall | ...................... | H04L 69/165 707/610 |
| 2021/0058459 A1 * | 2/2021 | Faibish | ................. | H04L 67/133 |

OTHER PUBLICATIONS

Sang-Hoon Kim, Youngjae Lee and Jin-Soo Kim, "FlexRPC: A flexible Remote Procedure Call facility for modern cluster file systems," 2007 IEEE International Conference on Cluster Computing, Austin, TX, 2007, pp. 275-284, (Year: 2007).*

* cited by examiner

*Primary Examiner* — Daniel F. McMahon
(74) *Attorney, Agent, or Firm* — Kim & Stewart LLP

(57) ABSTRACT

A computer is configured to execute network file system (NFS) client software, and issue NFS commands to an NFS server along with checksums that are used by the NFS server to verify the integrity of remote procedure call (RPC) packets that include the NFS commands, by performing the steps of: computing a first checksum of a first RPC packet by applying a checksum algorithm to the first RPC packet, wherein the first RPC packet includes a first NFS packet, the first NFS packet including an NFS command to be performed by the NFS server; inserting the first checksum into the first RPC packet; creating a first transmission control protocol (TCP) packet that includes the first RPC packet having the first checksum inserted therein; and transmitting the first TCP packet to the NFS server over a network using a network interface controller (NIC).

20 Claims, 6 Drawing Sheets

100

102

400

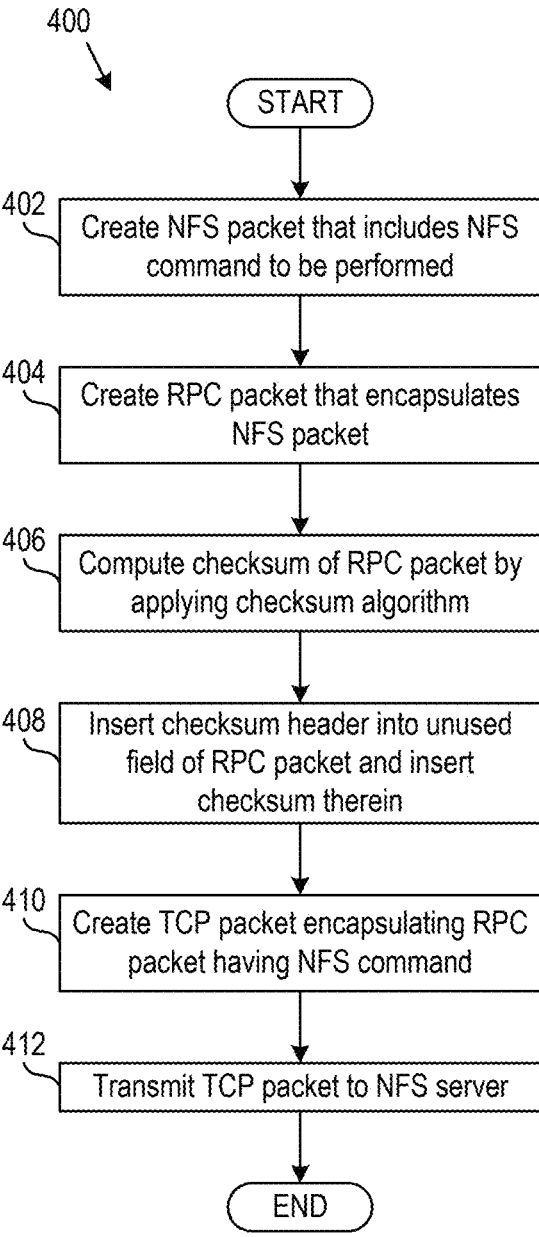

START

402  Create NFS packet that includes NFS command to be performed

404  Create RPC packet that encapsulates NFS packet

406  Compute checksum of RPC packet by applying checksum algorithm

408  Insert checksum header into unused field of RPC packet and insert checksum therein 410  Create TCP packet encapsulating RPC packet having NFS command 412  Transmit TCP packet to NFS server

END

START

502 Upon receiving TCP packet from NFS client, extract inner RPC packet

504 Extract checksum from RPC packet

506 Compute checksum of RPC packet by applying checksum algorithm

508 Verify that checksums match

510 Match?

N

Y

512 Extract NFS command from inner NFS packet

514 Respond to NFS command

END

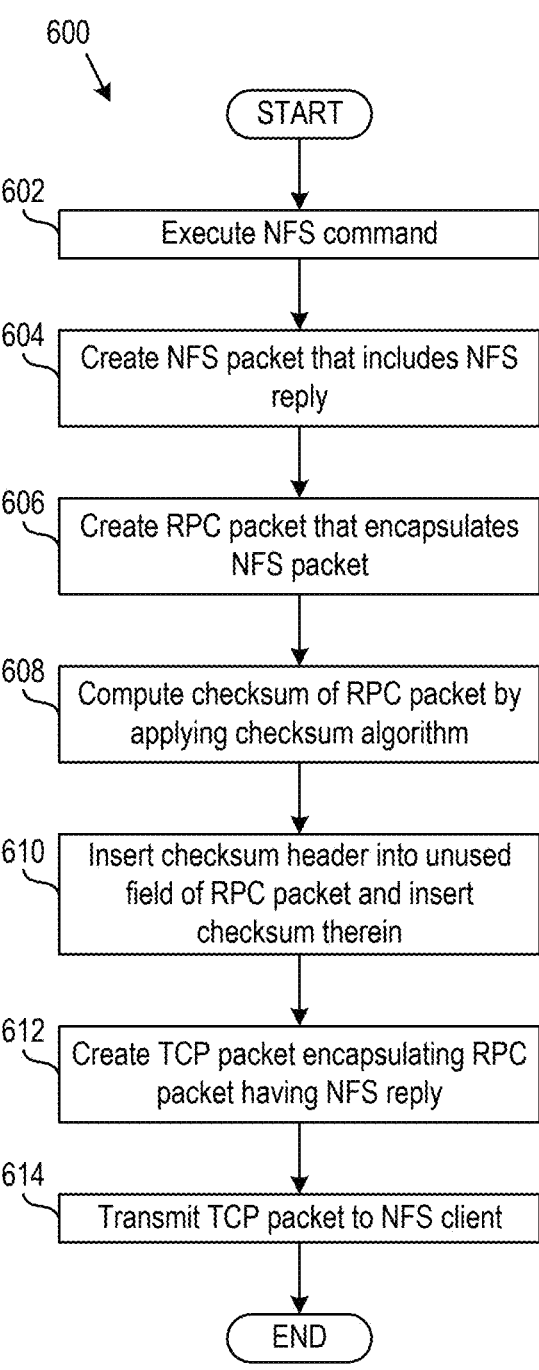

600

START

602 Execute NFS command

604 Create NFS packet that includes NFS reply

606 Create RPC packet that encapsulates NFS packet

608 Compute checksum of RPC packet by applying checksum algorithm

610 Insert checksum header into unused field of RPC packet and insert checksum therein 612 Create TCP packet encapsulating RPC packet having NFS reply 614 Transmit TCP packet to NFS client

END

Figure 6

DATA INTEGRITY VERIFICATION FOR NETWORK FILE SYSTEMS

BACKGROUND

Network file system (NFS) protocol is a distributed file system protocol that allows users on client computers to remotely access files over a computer network. The client computers generate commands according to the NFS protocol, referred to herein as "NFS commands," which include, e.g., commands for remote computers to read from and write to files stored therein. The client computers may be referred to as "NFS clients," and the remote computers as "NFS servers." As used herein, an NFS client is an entity that makes requests across a network using the NFS protocol for commands to be performed on files. An NFS client may be either a hardware computing device such as a server computer or software such as a virtual machine (VM) executing on such hardware. An NFS server is an entity that services such NFS commands by accessing files according to the NFS commands, the NFS server similarly being either a hardware computing device or software executing on such hardware.

One problem that persists for the NFS protocol is the lack of a reliable mechanism for ensuring the integrity of data communicated between NFS clients and servers. Such data is often corrupted, e.g., being tampered with during transmission across networks or being corrupted during reconstruction at either the NFS clients or servers. When such an error goes undetected, a variety of problems arise. For example, when an NFS client transmits a write command to an NFS server, and the NFS server acquires the incorrect data to write, the NFS server writes the incorrect data to one or more files, thus corrupting that file(s). As another example, when an NFS server reads data from one or more files in response to a read command, and the data is thereafter tampered with or otherwise corrupted, the NFS client receives the wrong data.

To combat the above problems, checksums are often employed, e.g., using functionality provided by the transmission control protocol (TCP). A checksum is a value (e.g., a numeric value) computed by applying a checksum algorithm to input data, the computed checksum being a summary or fingerprint of the input data. A sender of data may calculate a checksum of the data before transmission, and the recipient may calculate its own checksum of the data after receiving it. The recipient may then verify that the two checksums match to verify the authenticity of the data. However, the existing use of checksums using TCP functionality has not been able to reliably detect data integrity errors for NFS clients and servers.

TCP uses a checksum algorithm that is known to be error-prone: cyclic redundancy check (CRC) 16. There are situations in which such algorithm computes the same checksum for two different sets of data. These situations include certain cases in which two bits are flipped or in which there is only a relatively small number of bits that are different. In such cases, an NFS client or server incorrectly determines that the data was communicated successfully, leading to issues such as those discussed above with respect to read and write commands.

As another example, checksums are sometimes computed at network interface controllers (NICs) of NFS clients and servers. NICs are hardware components used by computers to connect to computer networks. However, NICs have been known to be unreliable for verifying data integrity for NFS clients and servers. For example, NICs sometimes fail, causing them to either compute incorrect checksums or skip computing checksums on packets of data altogether. As used herein a "packet" is a group of bits that may be transported together. Such issues in the NICs may go undetected for a period of time, leading to issues such as those discussed above. A mechanism is needed for improving the reliability of verifying data integrity for NFS clients and servers.

SUMMARY

One or more embodiments provide a computer including a processor and memory, wherein the processor executes instructions stored in the memory to execute NFS client software, and issue NFS commands to an NFS server along with checksums that are used by the NFS server to verify the integrity of remote procedure call (RPC) packets that include the NFS commands. The host computer performs the steps of: computing a first checksum of a first RPC packet by applying a checksum algorithm to the first RPC packet, wherein the first RPC packet include a first NFS packet, the first NFS packet including an NFS command to be performed by the NFS server; inserting the first checksum into the first RPC packet; creating a first TCP packet that includes the first RPC packet having the first checksum inserted therein; and transmitting the first TCP packet to the NFS server over a network using a NIC.

Further embodiments include a method comprising the above steps and a non-transitory computer-readable storage medium comprising instructions that cause a computer to carry out the above steps.

BRIEF DESCRIPTION OF THE DRAWINGS

FIG. 4 is a flow diagram of a method that may be performed by the NFS client to transmit an NFS command, according to some embodiments.

FIG. 6 is a flow diagram of a method that may be performed by the NFS server to transmit a reply to an NFS command, according to some embodiments.

DETAILED DESCRIPTION

Figure 1:
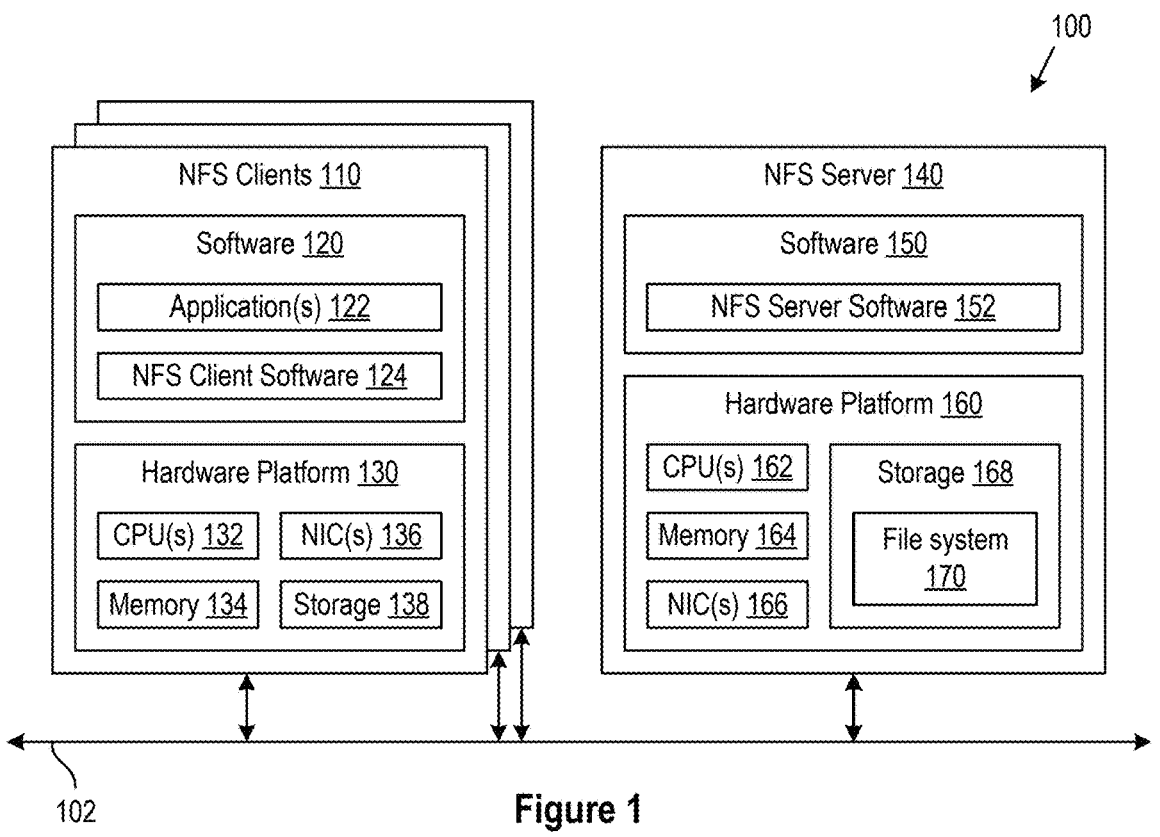
FIG. 1 is a block diagram of a computer system in which embodiments may be implemented.

Techniques are described for verifying data integrity for NFS clients and servers. The techniques involve NFS clients and servers utilizing a checksum algorithm such as CRC-32 or Fletcher-32, which is known to be less error-prone than checksums such as CRC-16 used by TCP. Before an NFS client transmits data to an NFS server including an NFS command, NFS client software of the NFS client computes a checksum. Upon receiving the data, NFS server software of the NFS server computes its own checksum and verifies that the two checksums match. Similarly, before the NFS server transmits data to the NFS client including a reply to the NFS command, the NFS server software computes a checksum. Upon the NFS client receiving the data, the NFS client software computes its own checksum and verifies that the two checksums match.

The NFS client and server communicate computed checksums therebetween using the Open Network Computing (ONC) Remote Procedure Call (RPC) protocol, referred to herein simply as the RPC protocol. The RPC protocol is a software communication protocol used in computer networks to allow for computers to request other (remote) computers to perform operations, e.g., an NFS client requesting an NFS server to perform operations. When an NFS client or server assembles data to transmit to the other such as for an NFS command or a reply to such NFS command, the NFS client or server creates a packet structured according to the NFS protocol, referred to herein as an "NFS packet." The NFS packet is encapsulated (included) in a packet structured according to the RPC protocol, referred to herein as an "RPC packet." The RPC packet is further encapsulated in other packets such as a packet structured according to the TCP protocol, referred to herein as a "TCP packet."

The RPC protocol defines various fields for populating in the RPC packets. For example, the RPC protocol defines an "XID" field, which stores a transaction identifier (ID) unique to an NFS command and a reply thereto. As another example, the RPC protocol defines a "Credentials" field, which stores authentication-related IDs such as a user ID of a user requesting an NFS command and a group ID of a group the user belongs to, e.g., an administrator group associated with administrative privileges. The RPC protocol also defines other fields that are typically unused by NFS clients and servers for communicating NFS commands and replies thereto. One example of such a field is a "Verifier" field, which is typically ignored by NFS clients and servers when authenticating users, particularly when using Unix-style authentication, which is discussed further below.

According to embodiments, when the NFS client or server computes a checksum, the checksum is computed based on the RPC packet (which includes the NFS packet). The computed checksum is then inserted into an unused field of the RPC packet such as the verifier header. As used herein, a "header" is a section of data that precedes a main body of data, e.g., to provide metadata or control information used for interpreting the main body. For example, a header of an RPC packet precedes the main body of the RPC packet.

When the RPC packet is communicated, the recipient NFS client or server extracts the checksum from the RPC packet and computes its own checksum of the RPC packet for comparison. If the checksums match, then the recipient NFS client or server has verified that data has been communicated successfully, i.e., has verified the data integrity. The techniques described herein offer various advantages for verifying data integrity for NFS clients and servers. For example, because NFS client software and NFS server software perform the checksum computations and verification, the NFS clients and servers do not rely on infrastructure such as NICs or existing parts of a network stack for such verification, such infrastructure being known to be unreliable for such functionality.

As another example, because the techniques allow for the usage of checksum algorithms that are known to be robust (not error-prone), the techniques allow for NFS clients and servers to more reliably detect data tampering and other data corruption. Furthermore, the techniques make use of otherwise unused fields of the same RPC packets that are transmitted between NFS clients and servers for communicating NFS commands and replies thereto. The techniques thus have a light footprint in terms of resources such as processing and network resources, without, e.g., adding procedures to protocols such as the RPC and NFS protocols, or requiring entities outside the NFS client and server computing or verifying checksums. Furthermore, the techniques do not tamper with (and possibly introduce errors with) existing functionalities, e.g., of the RPC and NFS protocols. These and further aspects of the invention are discussed below with respect to the drawings.

FIG. 1 is a block diagram of a computer system 100 in which embodiments may be implemented. Computer system 100 includes a plurality of NFS clients 110 and an NFS server 140. In the example of FIG. 1, each of NFS clients 110 is a computer constructed on a hardware platform 130 such as an x86 architecture platform. Hardware platform 130 includes components of a computer, such as one or more central processing units (CPUs) 132, memory 134 such as random-access memory (RAM), one or more NICs 136, and local storage 138 such as one or more magnetic drives or solid-state drives (SSDs). CPU(s) 132 are configured to execute instructions such as executable instructions that perform one or more operations described herein, which may be stored in memory 134. NICs 136 enable NFS clients 110 to communicate with other devices over a network 102 such as a local area network (LAN). Local storage 138 of NFS clients 110 may optionally be aggregated and provisioned as a virtual storage area network (vSAN).

Hardware platform 130 of each of NFS clients 110 supports software 120. Software 120 includes one or more applications 122 and NFS client software 124. An application is a computer program that may be launched on a computer system, such as for email services or office productivity services. NFS client software 124, which is executed outside NIC(s) 136, is software configured to perform functionalities related to NFS commands, including, e.g., computing checksums of RPC packets to be transmitted to NFS server 140, computing checksums of RPC packets received from NFS server 140, and verifying that checksums computed thereby match checksums received from NFS server 140.

In the example of FIG. 1, NFS server 140 is a computer constructed on a hardware platform 160 such as an x86 architecture platform. Similar to hardware platform 130, hardware platform 160 includes components of a computer, such as one or more CPUs 162, memory 164 such as RAM, one or more NICs 166, and local storage 168 such as one or more magnetic drives or SSDs. CPU(s) 162 are configured to execute instructions such as executable instructions that perform one or more operations described herein, which may be stored in memory 164. NIC(s) 166 enable NFS server 140 to communicate with other devices, e.g., over network 102.

Local storage 168 stores a file system 170, which includes and governs organization and access to files (not shown). In the example of FIG. 1, file system 170 is a clustered file system shared by applications 122 executing on NFS clients 110 and simultaneously mounted on NFS clients 110. Hardware platform 160 supports software 150, which includes NFS server software 152. NFS server software 152, which is executed outside NIC(s) 166, is software configured to perform functionalities related to replies to NFS commands, including, e.g., computing checksums of RPC packets to be transmitted to NFS clients 110, computing checksums of RPC packets received from NFS clients 110, and verifying that checksums computed thereby match checksums received from NFS clients 110.

It should be noted that embodiments are not limited to computer system 100 illustrated in FIG. 1 and instead apply to other computer systems. For example, each of NFS clients 110 and 140 may be implemented in software such as each being a virtual computing instance such as a VM. A virtualized computing instance is an addressable data compute node (DCN) or isolated user space instance, such as a VM or container. Such software may execute on computers such as those illustrated in FIG. 1.

As another example, although file system 170 is illustrated in FIG. 1 as being stored in local storage of NFS server 140, embodiments are not limited as such. For example, file system 170 may be implemented in shared storage outside of NFS server 140 including one or more storage arrays, such as network-attached storage (NAS) or in storage accessible to NFS server 140 via a storage area network (SAN). Such storage array(s) may comprise, for example, magnetic drives and/or SSDs. Additionally, NFS server 140 may contain a host bus adapter (HBA) for transmitting input/output operations (IOs) to such shared storage over a network separate from network 102 such as a fibre channel (FC) network.

Figure 2A:
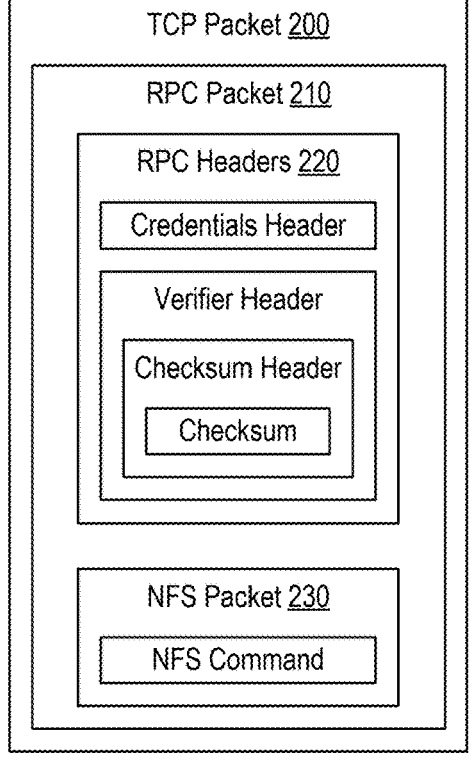
FIG. 2A is a block diagram illustrating an example of a TCP packet that may be used by an NFS client of the computer system for transmitting an NFS command, according to embodiments.

FIG. 2A is a block diagram illustrating an example of a TCP packet 200 that may be used by one of NFS clients 110 for transmitting an NFS command, according to embodiments. TCP packet 200 includes an RPC packet 210, and RPC packet 210 includes an NFS packet 230. NFS packet 230 includes an NFS command including, e.g., a write command to write data to a file of file system 170 or a read command to read data from a file thereof. In addition to NFS packet 230, RPC packet 210 includes RPC headers 220.

RPC headers 220 include, e.g., a credentials header and a verifier header. For example, when using Unix-style authentication, the credentials header stores authentication-related IDs such as a user ID of a user requesting the NFS command and a group ID of a group the user belongs to, e.g., an administrator group associated with administrative privileges. When TCP packet 200 is transmitted to NFS server 140, the credentials header is used thereby to authenticate the user before performing the NFS command. The verifier header is an example of a field that NFS clients 110 typically do not use when transmitting NFS commands, e.g., when using Unix-style authentication. Accordingly, a checksum of RPC packet 210 may be inserted into, e.g., a checksum header embedded in the verifier header, before TCP packet 200 is transmitted to NFS server 140.

Figure 2B:
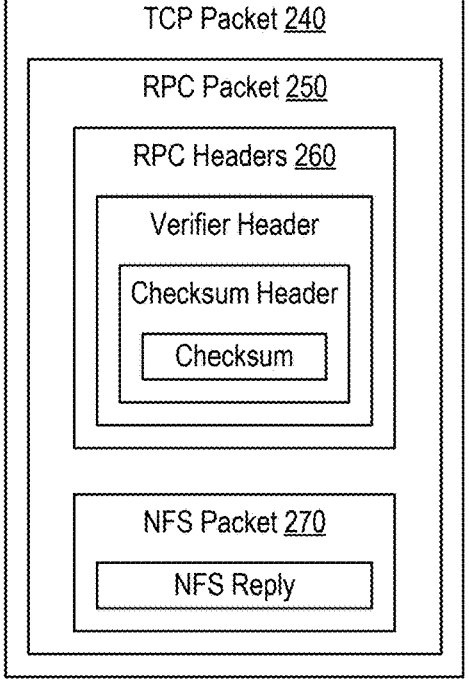
FIG. 2B is a block diagram illustrating an example of a TCP packet that may be used by an NFS server of the computer system for transmitting a reply to an NFS command, according to embodiments.

FIG. 2B is a block diagram illustrating an example of a TCP packet 240 that may be used by NFS server 140 for transmitting a reply to an NFS command, according to embodiments. TCP packet 240 includes an RPC packet 250, and RPC packet 250 includes an NFS packet 270. NFS packet 270 includes a reply to an NFS command, also referred to herein as an "NFS reply." For example, if NFS server 140 receives a write command, the NFS reply may include a message indicating that data was successfully written to a file of file system 170.

As another example, if NFS server 140 receives a read command, the NFS reply may include data read from a file of file system 170. In addition to NFS packet 270, RPC packet 250 includes RPC headers 260. RPC headers 260 include, e.g., a verifier header, which is an example of a field NFS server 140 typically does not use when transmitting NFS replies. Accordingly, a checksum of RPC packet 250 may be inserted into, e.g., a checksum header embedded in the verifier header, before TCP packet 240 is transmitted to one of NFS clients 110.

Figure 3:
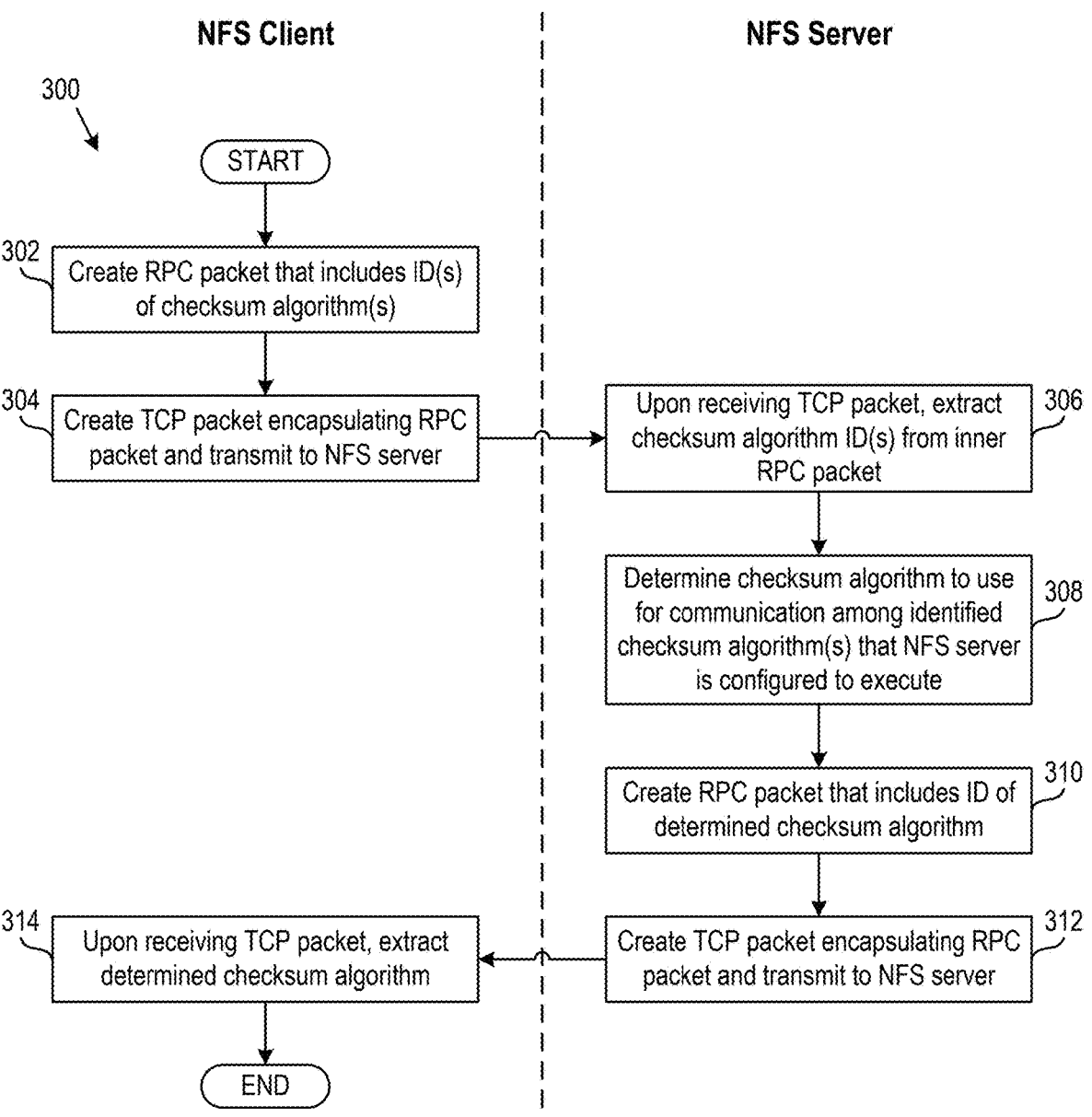
FIG. 3 is a flow diagram of a method that may be performed by the NFS client and server to determine a checksum algorithm to use for data integrity verification, according to some embodiments.

FIG. 3 is a flow diagram of a method 300 that may be performed by one of NFS clients 110 and NFS server 140 to determine a checksum algorithm to use for data integrity verification, according to some embodiments. NFS client software 124 may be configured to use a plurality of different checksum algorithms such as CRC-32 and Fletcher-32. However, NFS server software 152 may not be configured to use all of such algorithms. Accordingly, NFS client 110 and NFS server 140 may perform method 300 to determine a checksum algorithm that both are configured to compute, and which may be used for future communications.

At step 302, NFS client software 124 creates an RPC packet that includes one or more IDs of checksum algorithms that NFS client software 124 is configured to use, e.g., an ID of CRC-32 and an ID of Fletcher-32. NFS client software 124 may insert such ID(s) into otherwise unused fields of the RPC packet such as the verifier header. For example, NFS client software 124 may insert such ID(s) into a checksum header that is embedded in one of such otherwise unused fields. At step 304, NFS client software 124 creates a TCP packet encapsulating the RPC packet, and NFS client 110 transmits the TCP packet to NFS server 140, for example, across network 102 using NIC(s) 136. Before transmission, the TCP packet may be further encapsulated, including in an Internet Protocol (IP) packet, according to methods well-known in the art. At step 306, upon receiving the TCP packet, NFS server software 152 extracts the ID(s) of checksum algorithms from the inner RPC packet, e.g., from a checksum header in the verifier header.

At step 308, NFS server software 152 determines a checksum algorithm to use for communication among the checksum algorithm(s) identified by the inner RPC packet. NFS server software 152 determines to use a checksum algorithm that it is configured to execute. If NFS server software 152 is configured to execute a plurality of identified checksum algorithms, NFS server software 152 may use a variety of different methods for selecting one. For example, NFS server software 152 may apply a priority list that ranks such checksum algorithms according to factors such as how error-prone they are known to be, and NFS server software 152 may select the least error-prone of the identified checksum algorithms. At step 310, NFS server software 152 creates an RPC packet that includes an ID of the determined checksum algorithm. NFS server software 152 may include such ID in an otherwise unused field of the RPC packet such as the verifier header. For example, NFS server software 152 may insert such ID in a checksum header that is embedded in such otherwise unused field.

At step 312, NFS server software 152 creates a TCP packet encapsulating the RPC packet, and NFS server 140 transmits the TCP packet to NFS client 110, for example, using NIC(s) 166. Before transmission, the TCP packet may be further encapsulated, including in an IP packet. At step 314, upon receiving the TCP packet, e.g., over network 102 using NIC(s) 136, NFS client software 124 extracts the determined checksum algorithm, e.g., from a checksum header of the verifier header of the inner RPC packet, which verifies that NFS server software 152 is configured to execute the determined checksum algorithm. After step 314, method 300 ends, and NFS client software 124 and NFS server software 152 use the determined checksum algorithm for future communications.

It should be noted that additional steps beyond those illustrated in FIG. 3 may be performed when NFS client 110 and NFS server 140 initially communicate to establish the use of a particular checksum algorithm. For example, NFS client software 124 may compute a checksum of the RPC packet created at step 302 by applying the checksum algorithm thereto and insert the computed checksum into the otherwise unused field of the RPC packet, e.g., into the checksum header of the verifier header. Then, upon receiving the TCP packet at step 306, NFS server software 152 may compute a checksum of the RPC packet by applying the same checksum algorithm thereto and insert the computed checksum into the otherwise unused field of the RPC packet created at step 310, e.g., into the checksum header of the verifier header. Then, upon receiving the TCP packet at step 314, NFS client software 124 may extract the checksum inserted by NFS server software 152 and compare it to the checksum computed by NFS client software 124 to verify that they match. Determining such match further verifies that NFS client software 124 and NFS server software 152 are configured to use the same checksum algorithm for future communications.

FIG. 4 is a flow diagram of a method 400 that may be performed by one of NFS clients 110 to transmit an NFS command, according to some embodiments. Method 400 may be performed when one of application(s) 122 on NFS client 110 determines, e.g., to write to one or more files of file system 170 or to read from one or more files of file system 170. At step 402, NFS client software 124 creates an NFS packet that includes an NFS command to be performed, e.g., inserting into the NFS packet, a command to write to or read from a file.

At step 404, NFS client software 124 creates an RPC packet that encapsulates the NFS packet. At step 406, NFS client software 124 computes a checksum of the RPC packet by applying a checksum algorithm thereto. Such computation is thus not offloaded to NIC(s) 136. The input to the checksum algorithm may be, e.g., all the contents of the RPC packet except a field in which the checksum will be inserted (e.g., the verifier header). At step 408, NFS client software 124 inserts the checksum into an otherwise unused field of the RPC packet such as the verifier header, e.g., by inserting a checksum header into the verifier header and inserting the checksum into the checksum header.

At step 410, NFS client software 124 creates a TCP packet encapsulating the RPC packet having the NFS command in the inner NFS packet. At step 412, NFS client 110 transmits the TCP packet to NFS server 140, e.g., across network 102 using NIC(s) 136, i.e., issues the NFS command to NFS server 140. Before transmission, the TCP packet may be further encapsulated, including in an IP packet. After step 412, method 400 ends.

Figure 5:
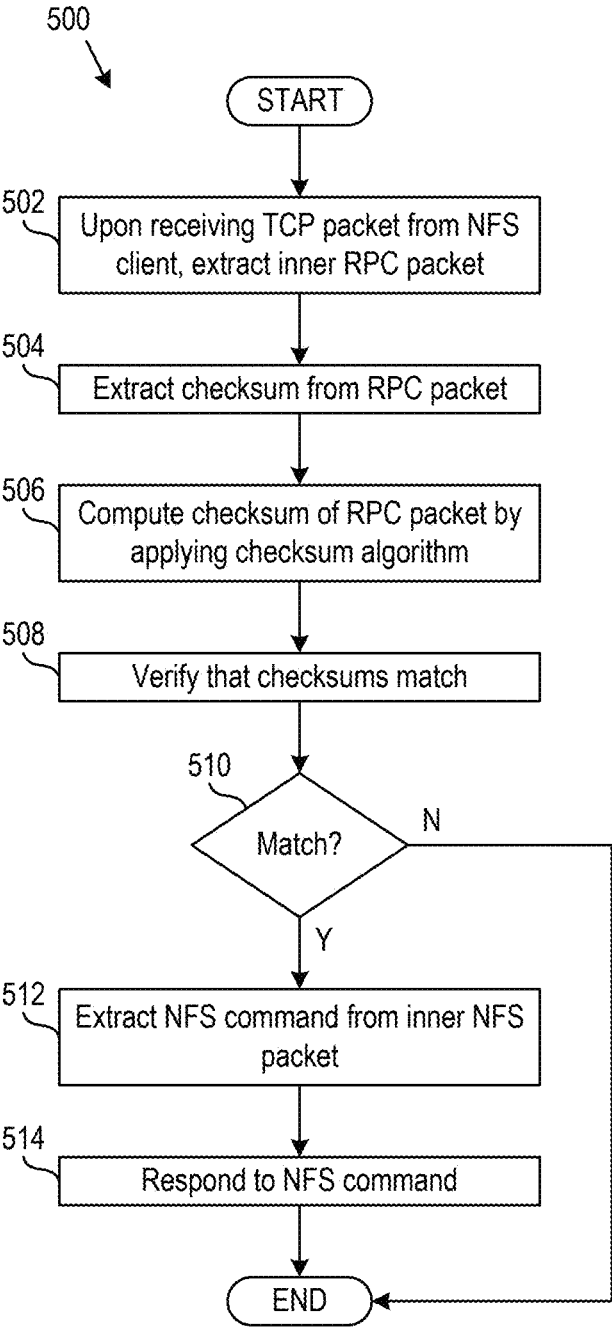
FIG. 5 is a flow diagram of a method that may be performed by the NFS server to verify data integrity for an NFS command, according to some embodiments.

FIG. 5 is a flow diagram of a method 500 that may be performed by NFS server 140 to verify data integrity for an NFS command, according to some embodiments. At step 502, upon receiving a TCP packet from one of NFS clients 110, NFS server software 152 extracts an inner RPC packet therefrom. At step 504, NFS server software 152 extracts a checksum from the RPC packet, e.g., from a checksum header in the verifier header. At step 506, NFS server software 152 computes a checksum of the RPC packet by applying a checksum algorithm thereto. Such computation is thus not offloaded to NIC(s) 166. The input to the checksum algorithm may be, e.g., all the contents of the RPC packet except a field from which the checksum of the RPC packet is extracted (e.g., the verifier header).

At step 508, NFS server software 152 compares the checksum extracted from the RPC packet at step 504 to the checksum computed at step 506, to verify that the checksums match, i.e., include the same value. At step 510, if the checksums do not match, method 500 ends. If the checksums do not match, NFS server software 152 may simply not respond to the TCP packet received from NFS client 110, which may prompt NFS client 110 to resend the TCP packet after a predetermined amount of time. The checksums not matching indicates an error in the communication of the RPC packet, e.g., the RPC packet being tampered with during transmission over network 102.

Returning to step 510, if the checksums match, thus verifying the integrity of the RPC packet, method 500 moves to step 512. At step 512, NFS server software 152 extracts an NFS command from the NFS packet, e.g., including a command from NFS client 110 to write to or read from a file of file system 170. At step 514, NFS server 140 responds to the NFS command, as discussed further below in conjunction with FIG. 6. After step 514, method 500 ends.

FIG. 6 is a flow diagram of a method 600 that may be performed by NFS server 140 to transmit an NFS reply, according to some embodiments. At step 602, NFS server software 152 executes an NFS command requested by one of NFS clients 110. For example, if the NFS command includes a command to write data to a file of file system 170, NFS server software 152 writes the data to the file. As another example, if the NFS command includes a command to read data from a file of file system 170, NFS server software 152 reads the data from the file.

At step 604, NFS server software 152 creates an NFS packet that includes an NFS reply based on the execution result of the NFS command. For example, if the NFS command was to write data to a file, NFS server software 152 may insert a message into the NFS packet indicating that data from the NFS command was successfully written to the file. As another example, if the NFS command was to read data from a file, NFS server software 152 may insert data read from the file into the NFS packet. At step 606, NFS server software 152 creates an RPC packet that encapsulates the NFS packet.

At step 608, NFS server software 152 computes a checksum of the RPC packet by applying a checksum algorithm thereto. Such computation is thus not offloaded to NIC(s) 166. The input to the checksum algorithm may be, e.g., all the contents of the RPC packet except a field in which the checksum will be inserted (e.g., the verifier header). At step 610, NFS server software 152 inserts the checksum into an otherwise unused field of the RPC packet such as the verifier header, e.g., by inserting a checksum header into the verifier header and inserting the checksum into the checksum header.

At step 612, NFS server software 152 creates a TCP packet encapsulating the RPC packet having the NFS reply in the inner NFS packet. At step 614, NFS server 140 transmits the TCP packet to NFS client 110, for example, using NIC(s) 166, thereby issuing the NFS reply thereto. Before transmission, the TCP packet may be further encapsulated, including in an IP packet. After step 614, method 600 ends.

Figure 7:
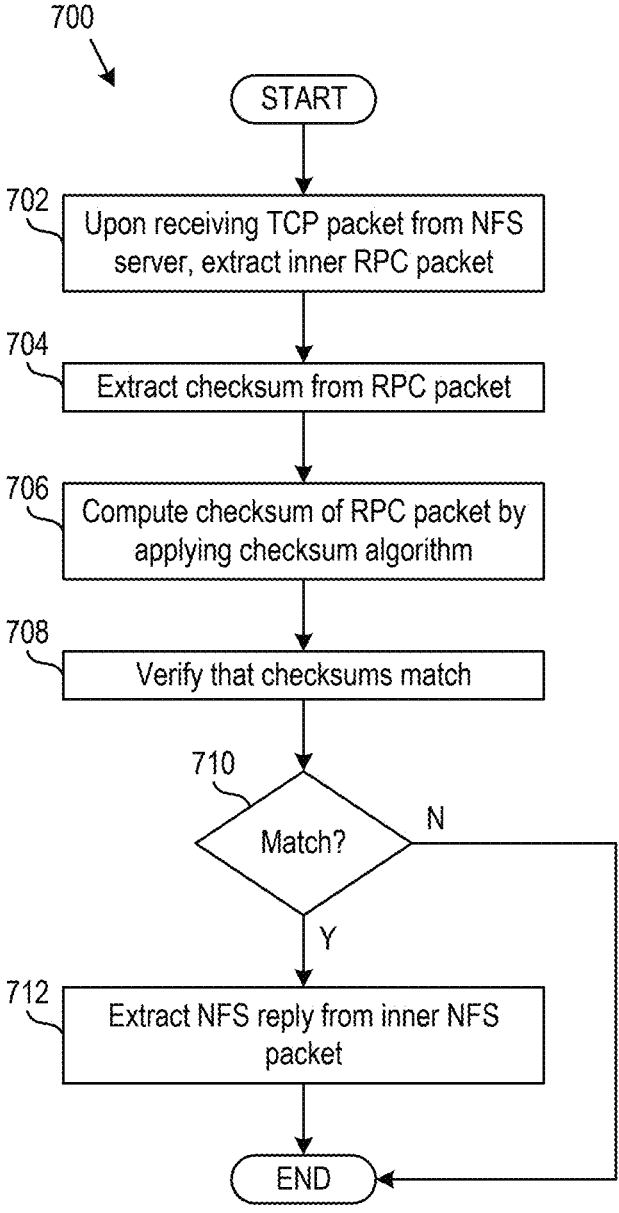
FIG. 7 is a flow diagram of a method that may be performed by the NFS client to verify data integrity for a reply to an NFS command, according to some embodiments.

FIG. 7 is a flow diagram of a method 700 that may be performed by one of NFS clients 110 to verify data integrity for an NFS reply, according to some embodiments. At step 702, upon receiving a TCP packet from NFS server 140, e.g., over network 102 using NIC(s) 136, NFS client software 124 extracts an inner RPC packet therefrom. The TCP packet is received in response to an NFS command previously issued by NFS client 110. At step 704, NFS client software 124 extracts a checksum from the RPC packet, e.g., from a checksum header in the verifier header. At step 706, NFS client software 124 computes a checksum of the RPC packet by applying a checksum algorithm thereto. Such computation is thus not offloaded to NIC(s) 136. The input to the checksum algorithm may be, e.g., all the contents of the RPC packet except a field from which the checksum of the RPC packet is extracted (e.g., the verifier header).

At step 708, NFS client software 124 compares the checksum extracted from the RPC packet at step 704 to the checksum computed at step 706, to verify that the checksums match, i.e., include the same value. At step 710, if the checksums do not match, method 700 ends. If the checksums do not match, NFS client software 124 may retransmit a TCP packet to NFS server 140 including, e.g., a write command or read command, as discussed above in conjunction with step 412 of FIG. 4. The checksums not matching indicates an error in the communication of the RPC packet, e.g., the RPC packet being tampered with during transmission over network 102.

Returning to step 710, if the checksums match, thus verifying the integrity of the RPC packet, method 700 moves to step 712. At step 712, NFS client software 124 extracts an NFS reply from the NFS packet. For example, if the NFS reply includes a message indicating that data from a previously issued NFS command including a write command, was successfully written to a file, NFS client software 124 has verified that the data has been written as such. As another example, if the NFS reply includes data read from a file in response to a previously issued NFS command including a read command, NFS client software 124 extracts the requested data from the NFS packet. After step 712, method 700 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

The embodiments described herein also relate to an apparatus for performing these operations. The apparatus may be specially constructed for required purposes, or the apparatus may be a general-purpose computer selectively activated or configured by a computer program stored in the computer. The embodiments described herein may also be practiced with computer system configurations including mobile computing devices, personal computers, server computers, microprocessor systems, mainframe computers, etc., and combinations thereof, which may communicate across one or more networks.

The embodiments described herein also relate to one or more computer programs or as one or more computer program modules embodied in computer-readable storage media. The term computer-readable medium refers to any data storage device that can store data, which can thereafter be input into an apparatus or computer system. Computer-readable media may be based on any existing or subsequently developed technology that embodies computer programs in a manner that enables a computer to read the programs. Examples of computer-readable media include magnetic drives, SSDs, NAS systems, RAM, read-only memory (ROM), compact disks (CDs), digital versatile disks (DVDs), and other optical and non-optical data storage devices. A computer-readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components may be implemented as a combined component. Similarly, structures and functionalities presented as a single component may be implemented as separate components. These and other variations, additions, and improvements may fall within the scope of the appended claims.

What is claimed is:

1. A computer including a processor and memory, wherein the processor executes instructions stored in the memory to execute network file system (NFS) client software, and issue NFS commands to an NFS server along with checksums that are used by the NFS server to verify the integrity of remote procedure call (RPC) packets that include the NFS commands, by performing the following steps:

computing a first checksum of a first RPC packet by applying a checksum algorithm to the first RPC packet, wherein the first RPC packet includes a first NFS packet, the first NFS packet including an NFS command to be performed by the NFS server;

inserting the first checksum into the first RPC packet;

creating a first transmission control protocol (TCP) packet that includes the first RPC packet having the first checksum inserted therein; and transmitting the first TCP packet to the NFS server over a network using a network interface controller (NIC).

2. The computer of claim 1, wherein the steps further include:

inserting the first checksum into a header of the first RPC packet, wherein the header of the first RPC packet is separate from the first NFS packet.

3. The computer of claim 1, wherein the steps further include:

receiving from the NFS server over the network using the NIC, a second TCP packet in response to the NFS command, wherein the second TCP packet includes a second RPC packet, the second RPC packet including a second checksum and a second NFS packet;

computing a third checksum of the second RPC packet by applying the checksum algorithm to the second RPC packet; and comparing the second checksum to the third checksum to verify whether the second checksum matches the third checksum.

4. The computer of claim 3, wherein the NFS command includes a write command requesting to write data to storage of the NFS server, and the steps further include:

inserting the write command into the first NFS packet; and upon verifying that the second checksum matches the third checksum, verifying that the data has been written to the storage of the NFS server based on a message in the second NFS packet.

5. The computer of claim 3, wherein the NFS command includes a read command requesting to read data from storage of the NFS server, and the steps further include:

inserting the read command into the first NFS packet; and upon verifying that the second checksum matches the third checksum, extracting the requested data from the second NFS packet.

6. The computer of claim 1, wherein the steps further include the following before computing the first checksum:

creating a second RPC packet that includes an identifier of the checksum algorithm;

creating a second TCP packet that includes the second RPC packet;

transmitting the second TCP packet to the NFS server over the network using the NIC; and upon receiving over the network using the NIC, a third TCP packet from the NFS server transmitted in response to the second TCP packet, extracting from a third RPC packet in the third TCP packet, information verifying that the NFS server is configured to execute the checksum algorithm.

7. The computer of claim 6, wherein the steps further include:

computing a second checksum of the second RPC packet by applying the checksum algorithm to the second RPC packet;

inserting the second checksum into the second RPC packet;

upon receiving the third TCP packet from the NFS server, extracting from the third RPC packet, a third checksum; and comparing the second checksum to the third checksum to verify whether the second checksum matches the third checksum.

8. A method of issuing network file system (NFS) commands to an NFS server along with checksums that are used by the NFS server to verify the integrity of remote procedure call (RPC) packets that include the NFS commands, the method comprising:

computing a first checksum of a first RPC packet by applying a checksum algorithm to the first RPC packet, wherein the first RPC packet includes a first NFS packet, the first NFS packet including an NFS command to be performed by the NFS server;

inserting the first checksum into the first RPC packet;

creating a first transmission control protocol (TCP) packet that includes the first RPC packet having the first checksum inserted therein; and transmitting the first TCP packet to the NFS server over a network using a network interface controller (NIC).

9. The method of claim 8, further comprising:

inserting the first checksum into a header of the first RPC packet, wherein the header of the first RPC packet is separate from the first NFS packet.

10. The method of claim 8, further comprising:

receiving from the NFS server over the network using the NIC, a second TCP packet in response to the NFS command, wherein the second TCP packet includes a second RPC packet, the second RPC packet including a second checksum and a second NFS packet;

computing a third checksum of the second RPC packet by applying the checksum algorithm to the second RPC packet; and comparing the second checksum to the third checksum to verify whether the second checksum matches the third checksum.

11. The method of claim 10, wherein the NFS command includes a write command requesting to write data to storage of the NFS server, the method further comprising:

inserting the write command into the first NFS packet; and upon verifying that the second checksum matches the third checksum, verifying that the data has been written to the storage of the NFS server based on a message in the second NFS packet.

12. The method of claim 10, wherein the NFS command includes a read command requesting to read data from storage of the NFS server, the method further comprising:

inserting the read command into the first NFS packet; and upon verifying that the second checksum matches the third checksum, extracting the requested data from the second NFS packet.

13. The method of claim 8, further comprising performing the following steps before computing the first checksum:

creating a second RPC packet that includes an identifier of the checksum algorithm;

creating a second TCP packet that includes the second RPC packet;

transmitting the second TCP packet to the NFS server over the network using the NIC; and upon receiving over the network using the NIC, a third TCP packet from the NFS server transmitted in response to the second TCP packet, extracting from a third RPC packet in the third TCP packet, information verifying that the NFS server is configured to execute the checksum algorithm.

14. The method of claim 13, further comprising:

computing a second checksum of the second RPC packet by applying the checksum algorithm to the second RPC packet;

inserting the second checksum into the second RPC packet;

upon receiving the third TCP packet from the NFS server, extracting from the third RPC packet, a third checksum; and comparing the second checksum to the third checksum to verify whether the second checksum matches the third checksum.

15. A non-transitory computer-readable medium comprising instructions that are executable in a computer, wherein the instructions when executed cause the computer to carry out a method of issuing network file system (NFS) commands to an NFS server along with checksums that are used by the NFS server to verify the integrity of remote procedure call (RPC) packets that include the NFS commands, and wherein the method comprises:

computing a first checksum of a first RPC packet by applying a checksum algorithm to the first RPC packet, wherein the first RPC packet includes a first NFS packet, the first NFS packet including an NFS command to be performed by the NFS server;

inserting the first checksum into the first RPC packet;

creating a first transmission control protocol (TCP) packet that includes the first RPC packet having the first checksum inserted therein; and transmitting the first TCP packet to the NFS server over a network using a network interface controller (NIC).

16. The non-transitory computer-readable medium of claim 15, wherein the method further comprises:

inserting the first checksum into a header of the first RPC packet, wherein the header of the first RPC packet is separate from the first NFS packet.

17. The non-transitory computer-readable medium of claim 15, wherein the method further comprises:

receiving from the NFS server over the network using the NIC, a second TCP packet in response to the NFS command, wherein the second TCP packet includes a second RPC packet, the second RPC packet including a second checksum and a second NFS packet;

computing a third checksum of the second RPC packet by applying the checksum algorithm to the second RPC packet; and comparing the second checksum to the third checksum to verify whether the second checksum matches the third checksum.

18. The non-transitory computer-readable medium of claim 17, wherein the NFS command includes a write command requesting to write data to storage of the NFS server, and the method further comprises:

inserting the write command into the first NFS packet; and upon verifying that the second checksum matches the third checksum, verifying that the data has been written to the storage of the NFS server based on a message in the second NFS packet.

19. The non-transitory computer-readable medium of claim 17, wherein the NFS command includes a read command requesting to read data from storage of the NFS server, and the method further comprises:

inserting the read command into the first NFS packet; and upon verifying that the second checksum matches the third checksum, extracting the requested data from the second NFS packet.

20. The non-transitory computer-readable medium of claim 15, wherein the method further comprises performing the following steps before computing the first checksum:

creating a second RPC packet that includes an identifier of the checksum algorithm;

creating a second TCP packet that includes the second RPC packet;

transmitting the second TCP packet to the NFS server over the network using the NIC; and upon receiving over the network using the NIC, a third TCP packet from the NFS server transmitted in response to the second TCP packet, extracting from a third RPC packet in the third TCP packet, information verifying that the NFS server is configured to execute the checksum algorithm.

* * * * *